May 17, 1960     W. J. STRANG ET AL     2,936,975
AIRCRAFT CONTROLS
Filed Aug. 30, 1954     3 Sheets-Sheet 1
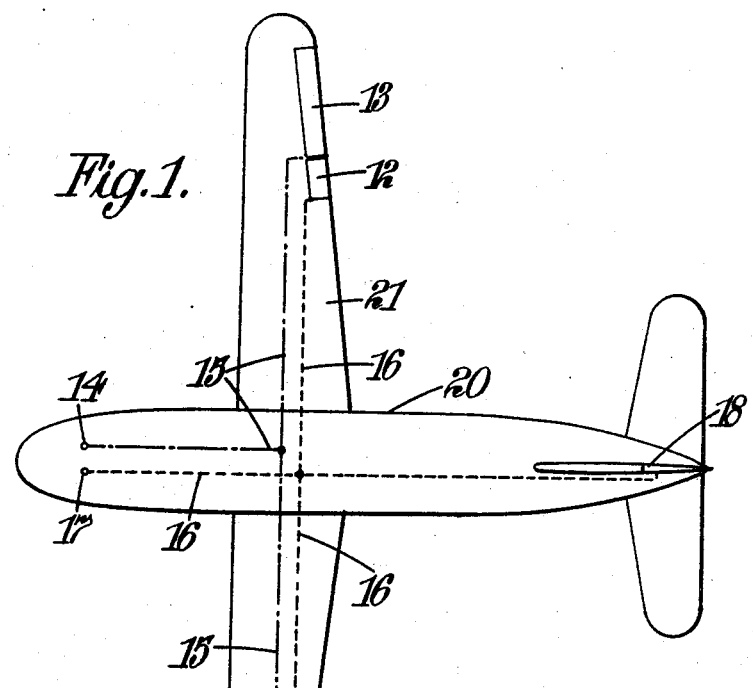
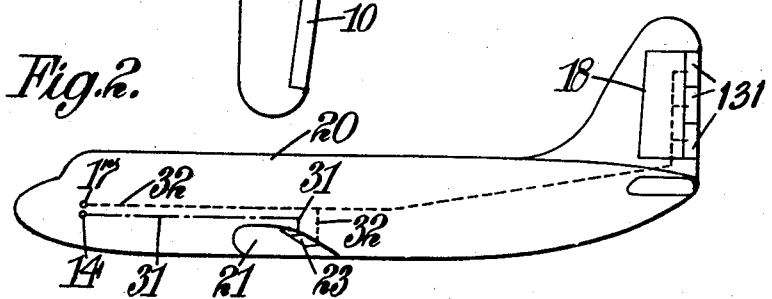
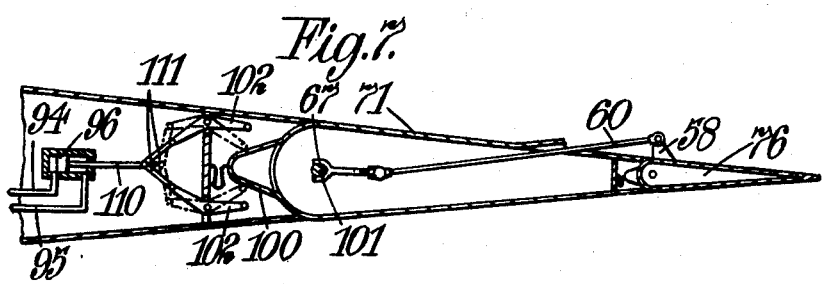

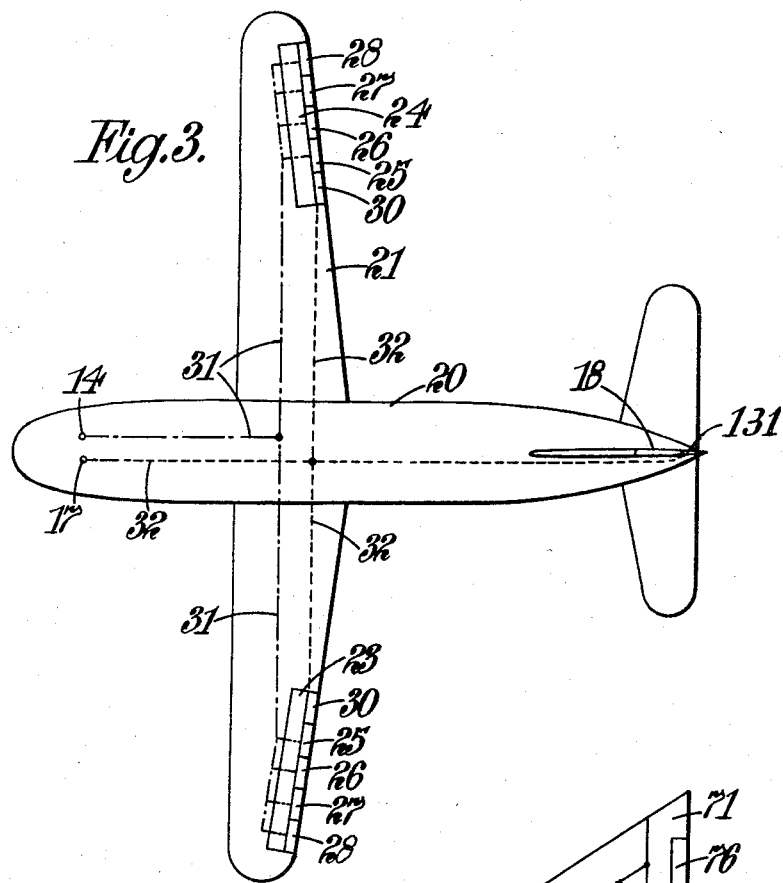
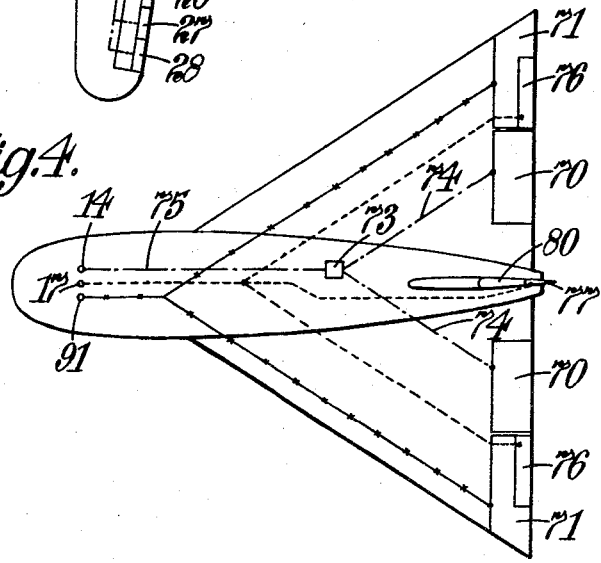

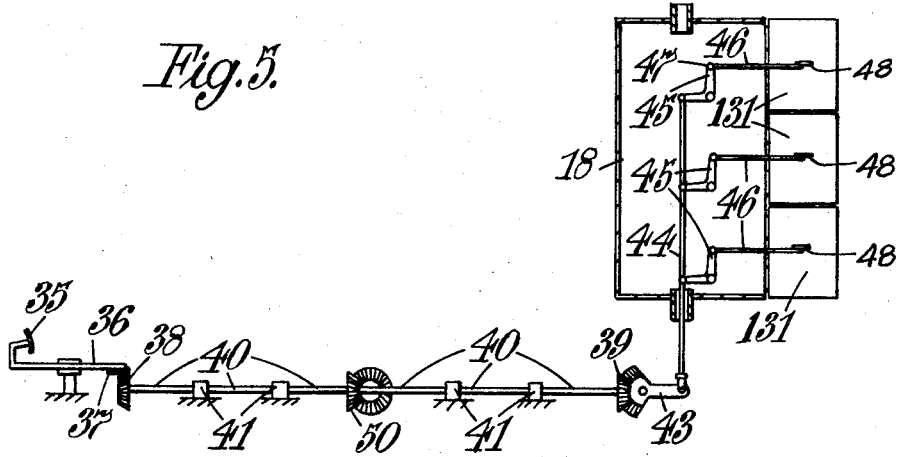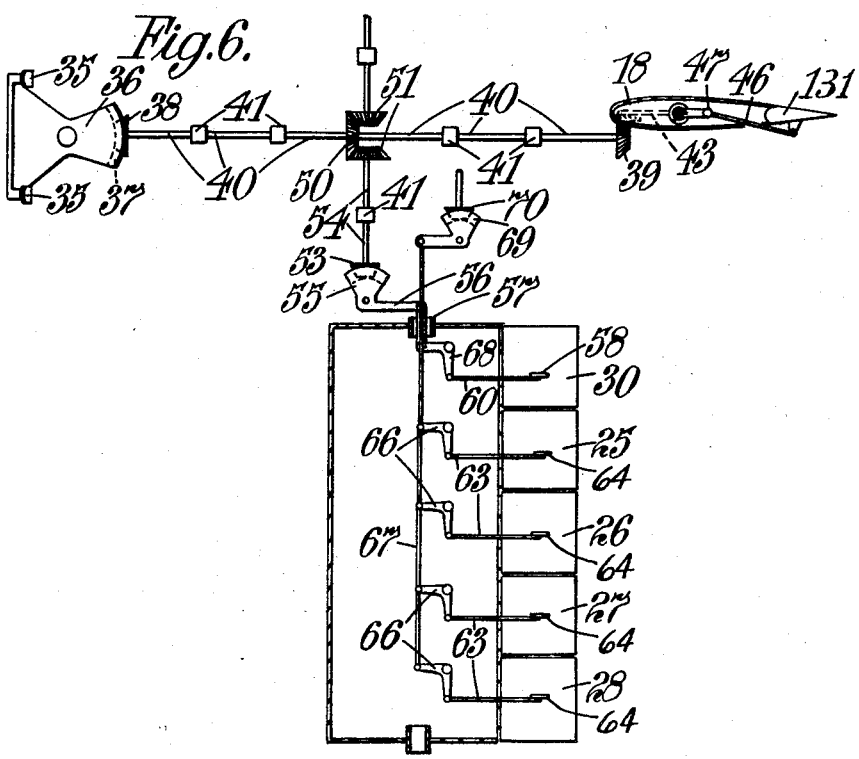

United States Patent Office 2,936,975
Patented May 17, 1960

2,936,975

AIRCRAFT CONTROLS

William John Strang and Donald Lewis Matthews, Bristol, England, assignors, by mesne assignments, to Bristol Aircraft Limited, Bristol, England, a British company Application August 30, 1954, Serial No. 452,899

Claims priority, application Great Britain September 3, 1953

1 Claim. (Cl. 244—83)

This invention relates to fixed wing aircraft and is more particularly concerned with the controls for the ailerons and the vertical rudder.

In normal flight, horizontal turns of such aircraft are accomplished by the combined action of the ailerons and the vertical rudder, the ailerons being moved to "bank" the aircraft, i.e. to depress the wing on the inside of the turn and to raise the outer wing. If the ailerons are moved in the opposite sense relatively to the rudder, a manoeuvre known as sideslip occurs in which the aircraft does not turn but proceeds in a more or less straight path with its longitudinal axis lying at an angle to the direction of motion. This is a useful manoeuvre for certain purposes, and for this reason it is not desirable to interconnect the aileron and rudder controls in such a manner as would prevent it, although such arrangements have been proposed.

Some aircraft, more particularly low substantially straight wing types with a wing dihedral less than 5° and high vertical rudders have, however, the characteristic that they will sideslip for small applications of the vertical rudders alone, and this has the disadvantage of making landing more difficult since they cannot be aligned with the runway simply by momentary application of rudder control in the customary manner, but must also be rolled to a slight extent, thus calling for special skill and experience on the part of the pilot. This characteristic can of course be eliminated by increasing the dihedral angle of the wings, but this has an attendant disadvantage that the smooth flying qualities of aircraft with low dihedral wings in gusty air conditions are lost.

An object of the present invention is to obviate this undesirable characteristic without increasing the dihedral angle and without making it impossible to cause the aircraft to sideslip as and when required or impairing its flying qualities under ordinary flying conditions.

To this end, according to the invention a control system for a fixed wing aircraft having ailerons and a vertical rudder system includes a pilot's rolling control acting on a first aileron system in the sense to roll the aircraft, but having no action on the vertical rudder system, and a pilot's yawing control acting on the vertical rudder system and on a second aileron system interconnected therewith in the sense to produce banked turns, either said first aileron system being of greater aircraft rolling power than said second aileron system, or additional means being provided enabling operation of the vertical rudder system without operation of said second aileron system to be selected.

In one arrangement according to the invention, the aircraft is provided with two port and two starboard ailerons of different aircraft rolling power, the ailerons of less rolling power being operated by the pilot's yawing control in common with the vertical rudder system in the sense to produce banked turns, and the other ailerons being operated directly by the pilot's rolling control, this latter having no action on the vertical rudder system.

In another arrangement, according to the invention, which is applicable to high speed aircraft with wings having swept back leading edges, the aircraft is provided with inner and outer port ailerons and inner and outer starboard ailerons, the inner ailerons being directly controllable by the pilot's rolling control and the outer ailerons being operable by the pilot's yawing control in common with the vertical rudder system in such a way that they can be locked when desired without preventing operation of the vertical rudder system.

A preferred arrangement of the kind defined in the immediately preceding paragraph further includes a servo-motor arranged within the aircraft and connected by an operating transmission to the inner port and starboard ailerons, control transmission means operable by the pilot's rolling control for controlling the servo-motor, at least one servo-tab on each of the outer port and starboard ailerons, operating transmissions connecting the pilot's yawing control with each of said servo-tabs and the vertical rudder system, and means for locking the outer port and starboard ailerons in a neutral position during flight.

By a "neutral position," is meant a position in which the ailerons form a smooth continuation of the wing of the aircraft.

In yet another arrangement according to the invention, the aircraft is provided with a port aileron and a starboard aileron and two servo devices of different power acting on each aileron, the servo devices of less power being operated by the pilot's yawing control in common with the vertical rudder system in the sense to produce banked turns, and the servo devices of greater power being operated by the pilot's rolling control, this latter having no action on the vertical rudder system, and the servo systems being so arranged that operation of neither causes a reaction upon the pilot's control pertaining to the other.

A preferred arrangement of the kind defined in the immediately preceding paragraph includes at least two servo tabs on each aileron, rudder control pedals connected by an operating transmission to the rudder system and to a servo tab on each aileron, and a control column connected by an operating transmission to another servo tab on each aileron.

Three embodiments of the present invention will now be described merely by way of example, with reference to the accompanying drawings whereof:

Figure 1 is a plan view of an aircraft showing diagrammatically one control system in accordance with the invention, Figure 2 is a side elevation of an aircraft showing diagrammatically another control system in accordance with the invention, Figure 3 is a plan view of the aircraft shown in Figure 2, Figure 4 is a plan view of an aircraft showing diagrammatically yet another control system in accordance with the invention, Figures 5 and 6 are diagrammatic illustrations in side elevation and plan respectively of the layout of a control transmission for simultaneously operating an aileron system and a rudder system from a pilot's yawing control, and Figure 7 is a partial view in cross-section showing means for locking an aileron in a neutral position during flight.

Referring to Figure 1, in the first embodiment, the control system comprises two port and two starboard ailerons 10, 11, 12 and 13 respectively, of which 11 and 12 are inner ailerons and 10 and 13 are outer ailerons. The outer ailerons 10 and 13 have approximately three times the effective surface area of the inner ailerons 10 and 13, and because of this, and also because the outer ailerons are further from the longitudinal centre line of the aircraft, the outer ailerons have a greater aircraft rolling power than the inner ailerons.

The outer ailerons 10 and 13 are directly connected by a control transmission of any well known or convenient form to a control column or pilot's rolling control 14, as is indicated by the chain-dot lines 15 so that as the rolling control is operated the ailerons 10 and 13 are moved in opposite directions to roll the aircraft in one direction or the other in well known manner.

The inner ailerons 11 and 12 are connected for direct operation by a control transmission indicated by the dotted lines 16 to a rudder bar or pilot's yawing control 17. The control transmission 16 also connects a rudder 18 to the yawing control for simultaneous operation with the inner ailerons, in the sense to produce a banked turn in one direction or the other. A suitable control transmission for simultaneously operating the ailerons 11 and 12 and the rudder 18 from the yawing control 17 will later be described with reference to Figures 5 and 6.

With the control system described, it will be seen that by operating the yawing control alone, the pilot may put the aircraft into a banked turn. If, however, the pilot wishes to sideslip the aircraft, he may do this by operating the yawing control and the rolling control at the same time, in the manner such that the outer ailerons, which are of greater rolling power, override the effect of the inner ailerons. If the system is applied to an aircraft which has the characteristic of sideslipping on small applications of the vertical rudder alone, instead of turning, this characteristic is avoided since on operation of the rudder control the aircraft is banked by the inner ailerons which are simultaneously operated without further control action on the part of the pilot. Of course, the inner and outer ailerons may be operated in the same sense when putting the aircraft into a banked turn, for example, in a case where the effect of the inner ailerons alone does not bank the aircraft sufficiently. Furthermore, the rolling power of the inner and outer ailerons may be selected so that with the difference of their rolling powers the aircraft cannot be sideslipped to any dangerous extent.

The control system just described is shown in Figure 1 as applied to an aircraft 20 having a low substantially straight wing 21 of 3° dihedral and a high vertical rudder.

Figures 2 and 3 show another control system according to the invention applied to the aircraft of Figure 1.

In this case, the aircraft is provided with one port aileron 23 and one starboard aileron 24. Each aileron has five equally dimensioned servo-tabs along its trailing edge, the four outer tabs 25, 26, 27 and 28 of each aileron being operated together by means of a direct mechanical linkage from the control column or pilot's rolling control 14, while the rudder pedals or pilot's yawing control 17 are connected by a direct mechanical linkage with the innermost tab 30 of each aileron, and with three servo-tabs 131 provided along the trailing edge of the rudder 18.

The direct mechanical linkage to the four outer servo-tabs on each wing is indicated in Figures 2 and 3 by the chain-dot lines 31. This linkage or control transmission may take any well known form and accordingly it will not be described in any detail.

The direct mechanical linkage or control transmission linking the inner servo-tabs 30 and the tabs 131 to the yawing control is indicated in Figures 2 and 3 by the dotted lines 32. A suitable control transmission for this purpose is illustrated in Figures 5 and 6 and will now be described.

The pilot's yawing control comprises the usual rudder pedals 35 on a pivotally mounted plate 36. The plate 36 has a sector bevel gear 37 which co-operates with a bevel gear 38. Rotation of gear 38 is transmitted to a bevel gear 39 by a series of shafts 40 interconnected by torque transmission joints or change speed gear boxes 41. The gear 39 is located adjacent the rudder 18 and co-operates with a pivoted bevelled sector gear 42 having an arm 43 which is connected by a push/pull rod 44 to one arm of each of three bell crank-levers 45 pivoted within the rudder 18, the rod 44 lying generally along the pivot axis of the rudder. The other arms of the bell-crank levers 45 are connected each to one of the servo tabs 131 by control rods 46, the rods 46 being connected to the bell-crank levers by universal joints 47 and to the tabs 31 by lugs 48 so that movement of the arm 43 operates the servo-tabs 31 in unison.

In order to transmit control movements of the plate 36 to the inner servo-tabs 30, an intermediate shaft 40 is provided with a bevel gear 50 which co-operates with two bevel gears 51, one on each side. The bevel gears 51 transmit rotational movement each to a pinion 53 located adjacent the inner end of one of the ailerons 23 or 24 by means of a series of shafts 54 interconnected by transmission joints or change speed gear boxes 41 as before. Each pinion 53 co-operates with a sector gear 55 having an arm 56 pivotally connected to a push-pull sleeve 57 lying along the pivot axis of the aileron, and the sleeve is in turn pivoted to one arm of a bellcrank lever 68 the other arm of which is connected to a lug 58 on the servo-tab 30 of the aileron by means of a control rod 60 so that endwise-movement of the sleeve 57 operates the servo-tab. With the transmission described, it will be appreciated that on operation of the rudder pedals 35, the servo-tabs 31 and the servo-tabs 30 are moved in the sense to put the aircraft into a banked turn in the required direction.

Also shown in Figure 6 is part of the control transmission 31 connecting the pilot's rolling control 14 with the outer servo-tabs 25, 26, 27 and 28. These tabs are operated together each by a rod 63 connecting a lug 64 on the tab to a bellcrank lever 66 connected to a shaft 67 lying along the pivot axis of the aileron, the shaft 67 passing through the sleeve 57 and being operated by a sector gear 69 which co-operates with a pinion 70 rotatable in the correct sense by the pilot's rolling control.

The outer servo-tabs 25 to 28 and the inner servo-tabs 30 constitute servo devices for moving the ailerons in well known manner and by reason of the fact that the four outer tabs of each aileron are connected for operation by the pilot's rolling control while only the single inner tabs of each aileron are connected for operation by the pilot's yawing control, it will be appreciated that the rolling control has a greater aircraft rolling power than the yawing control and may be used to override the rolling effect of the yawing control when sideslip is required. Furthermore, since the yawing control operates both rudder and ailerons, the yawing control alone may be used to put the aircraft into a banked turn.

In the control system described with reference to Figure 1 the control transmission 16 may be as described with reference to Figures 5 and 6, except of course, that the control rods 60 will operate the ailerons 11 and 12 instead of the servo tabs 30, and the rod 44 will operate a single bell-crank lever 45 one arm of which will be connected by a control rod 46 directly to the rudder 18.

Another constructional example illustrating the application of the invention to a high speed aircraft having swept-back wings will now be described with reference to Figures 4, 5, 6 and 7. In this case, the aircraft is provided with inner and outer port and starboard ailerons 70 and 71 respectively, the outer ailerons having the greater rolling power by virtue of their greater distance from the longitudinal axis of the aircraft. The inner ailerons 70 are operated directly by power developed by a servo-motor 73 arranged within the aircraft and controlled by the pilot's rolling control 14. The operating transmission between the servo-motor 73 and the ailerons 70 is indicated in Figure 4 by the chain-dot lines 74 and this may take any well known form and consequently will not be described. The control transmission between the pilot's rolling control 14 and the servo-motor 73 is indicated by the chain-dot line 75 in Figure 4 and this also may take any well known form and is, therefore, not described.

The outer ailerons 71 are freely hinged to the wings, or alternatively resiliently hinged as described in the specification accompanying United States patent application Serial No. 452,869, and are provided each with a servo-tab 76 extending about two-thirds of the way along the trailing edge of the aileron from its inner corner.

The servo-tabs 76 are operated in common with one or more servo-tabs 77 on the trailing edge of the rudder 80 from the pilot's yawing control 17 by means of an operating transmission for example, similar to that previously described with reference to Figures 5 and 6.

Since for high speed flight it is desirable that the combined rolling power of the controls should be substantially reduced, so as to avoid the danger of excessive sensitivity to the controls, means is provided to lock the outer ailerons 71 in a neutral position so that the rudder 80 may be operated by the pilot's yawing control without moving the outer ailerons. These locking means will now be described with reference to Figure 7.

Mounted within the aircraft wing adjacent each outer aileron is a hydraulic jack 90. Hydraulic fluid under pressure is supplied to each jack by pipes 94, 95 from any convenient source under the control of an aileron locking control 91 in the pilot's cockpit, either to move the jack piston 96 to the outer end of its stroke to lock the adjacent aileron in a neutral position as shown in Figure 7 or to move the jack piston to the inner end of its stroke to free the aileron. To this end, the aileron carries a projection 100 forwardly of its pivot axis 101 and two bell-crank levers 102 are mounted in the wing so that in one position, as indicated in full lines, they are clear of the projection 100 and allow movement of the aileron throughout its whole range, and in another position, as indicated in chain dot lines, they engage the projection and hold the aileron in its neutral position. The bell-crank levers 102 are connected to the jack piston by a connecting rod 110 and two toggle links 111 so that as the piston is moved from the inner to the outer end of its stroke, the ends of the free arms of the bell-crank levers are moved towards each other one or other of the free ends engaging the projection 100 and moving the aileron to its neutral position.

It is to be understood that the outer ailerons 71 are only locked during high speed flight, and when flight speed is reduced, for example when coming in to land, the ailerons 71 are unlocked and thus enabled to function under the control of the pilot's yawing control 17 to counteract any tendency to side slip upon small applications of the vertical rudder. During high speed flight rolling control is obtained with the pilot's rolling control 14 and the inner ailerons to which it is operatively connected. In order to put the aircraft into a banked turn during high speed flight with the ailerons 71 locked the rolling control 14 and the yawing control 17 are operated in the conventional manner, the inner ailerons 70 banking the aircraft in the required direction, and overcoming the action of the servo-tabs 76 which are adjusted with the rudder upon operation of the yawing control in the sense to bank the aircraft in the other direction.

We claim:

In a fixed wing aircraft having a port and a starboard wing aileron, a system of servo-tabs on said ailerons for operating the ailerons comprising at least one servo-tab on each aileron connected for operation by a pilot's rolling control, and a pilot's yawing control connected to operate a vertical rudder small applications of which, when said pilot's rolling control is in a neutral setting would cause side-slipping of the aircraft; a second system of servo-tabs on said ailerons for operating the ailerons comprising a servo-tab on each aileron connected to said pilot's yawing control for operation with said rudder to cause operation of said ailerons in the sense to oppose such side-slipping of the aircraft, said second system of servo-tabs being of lesser power than said first system of servo-tabs.

References Cited in the file of this patent

UNITED STATES PATENTS

| | | |
|---|---|---|
| 1,707,690 | Sperry | Apr. 2, 1929 |
| 2,542,946 | Ross | Feb. 20, 1951 |

FOREIGN PATENTS

| | | |
|---|---|---|
| 619,169 | Great Britain | Mar. 4, 1949 |